A. O. KAPLAN & A. ILLOWY.
Combined Horse-Detacher and Brake.
No. 216,962. Patented July 1, 1879.
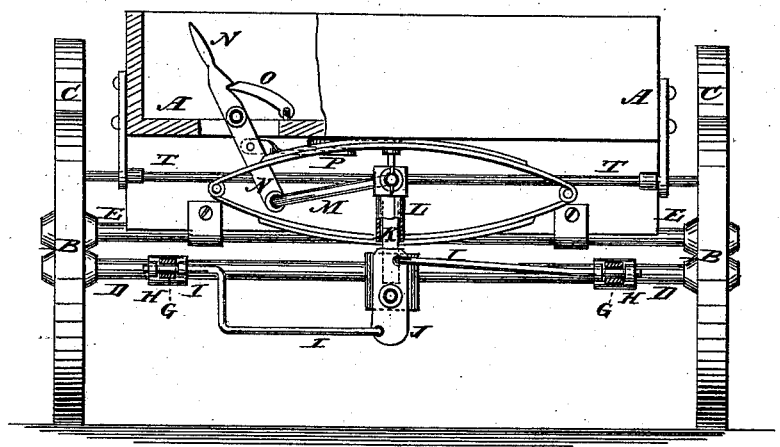
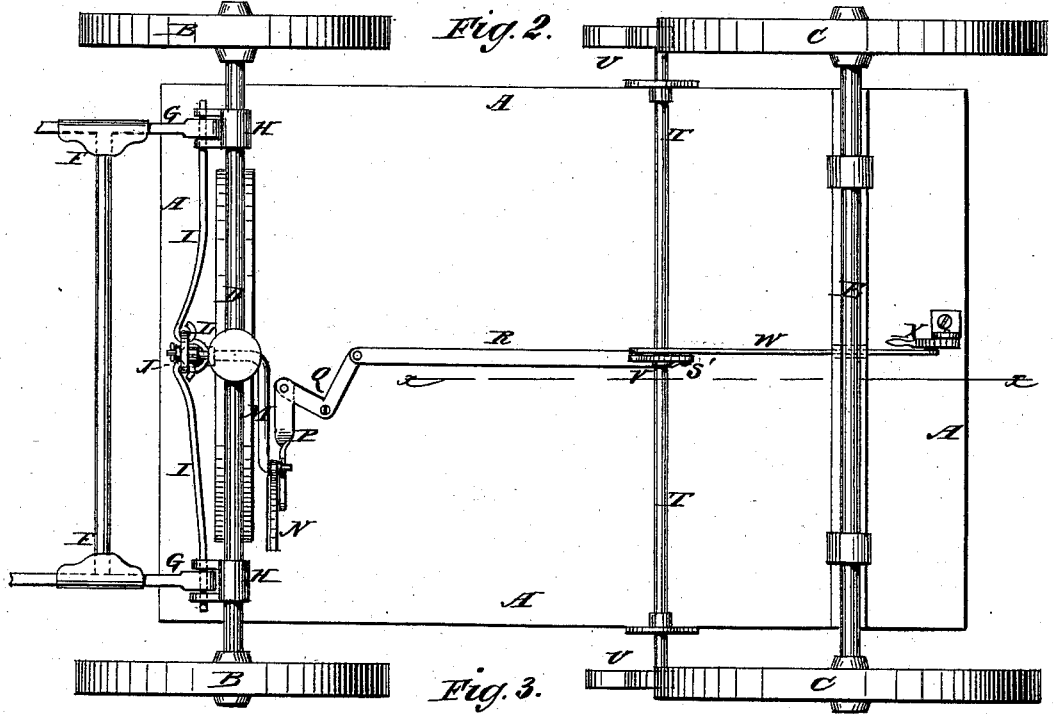
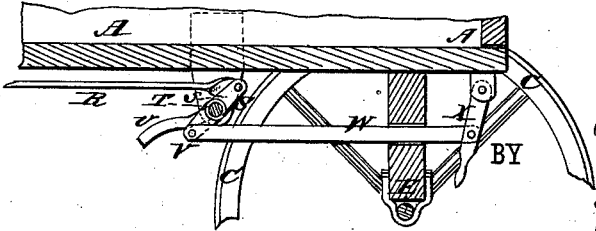

UNITED STATES PATENT OFFICE.

ABE O. KAPLAN AND ADOLPH ILLOWY, OF CINCINNATI, OHIO.

IMPROVEMENT IN COMBINED HORSE-DETACHER AND BRAKE.

Specification forming part of Letters Patent No. 216,962, dated July 1, 1879; application filed December 3, 1878.

*To all whom it may concern:*

Be it known that we, ABE O. KAPLAN and ADOLPH ILLOWY, of Cincinnati, in the county of Hamilton and State of Ohio, have invented a new and Improved Combined Horse-Detaching Apparatus and Brake, of which the following is a specification.

Figure 1 is a front view of a wagon to which our improvements have been applied, parts being broken away to show the construction. Fig. 2 is an under-side view of the same. Fig. 3 is a detail sectional view of the same, taken through the line $x\ x$, Fig. 2.

Similar letters of reference indicate corresponding parts.

The object of this invention is to furnish an improved device for attachment to wagons, carriages, and other vehicles, which shall be so constructed that the horse (should he become unmanageable from fright or other cause) may be instantly detached and the advance of the vehicle checked, preventing the passengers from being injured and the vehicle from being broken, while rendering the horse less liable to be injured than if he were allowed to run with the vehicle attached to him, and which shall be simple in construction and easily operated.

The invention consists in the combination of the long pins, the equal-armed lever, provided with the pin, the socket, the connecting-rod, and the lever, with the thill-couplings and the body of the vehicle; in the combination of the long pins, the equal armed lever, provided with the pin, the socket, the connecting-rod, the lever, the connecting-rods, the bent lever, and the brake-bar, provided with the arm and the shoes, with the thill-couplings and the body of the vehicle; and in the combination of the long pins, the equal-armed lever, provided with the pin, the socket, the connecting-rod, the lever, the connecting-rods, the bent lever, the brake-rod, provided with the arms and the shoes, and the pivoted bar, with the thill-couplings and the body of the vehicle, as hereinafter fully described.

A represents the body of the vehicle; B, the front wheels; C, the rear wheels; D, the front axle; E, the rear axle, and F the thills.

The thills or pole F are connected with the front axle, D, by the thill-irons G and the axle-clips H, the bolts of which are replaced by long pins or rods I, the inner ends of which are pivoted to the opposite ends of an equal-armed lever, J. The lever J is pivoted to the middle part of the front axle, D, or to a support attached to the said axle.

The upper end of the lever J is rounded off, or has a pin, K, formed upon or attached to it, which pin K works in a socket, L. The upper end of the socket L is pivoted to the end of a rod, M, the other end of which is pivoted to the lower end of a lever, N. The lever N passes up through the bottom of the body A at or near the inner side of the front end-board, and is pivoted to the said bottom or to a support attached to it.

The long pins or rods I are locked in place in the thill-couplings G H, and kept from being accidentally withdrawn by a pawl, O, pivoted to the bottom of the body A, and which engages with a notch in the upper part of the said lever N; or the lever N may be locked by any other suitable device that can be instantly disengaged.

To the lower part of the lever N is pivoted the end of a connecting-bar, P, the other end of which is pivoted to the end of an elbow-lever, Q. The lever Q is pivoted at its angle to the bottom of the body A, and to its other end is pivoted the end of a connecting-rod, R, the other end of which is pivoted to an arm, S, rigidly attached to the brake-bar T. The brake-bar T rocks in bearings attached to the body A, and to its ends are attached the brake-shoes U.

With this construction the pins I will be withdrawn from the thill-couplings G H to detach the horse, and the brake-shoes U will be applied to the wheels to stop the vehicle by a single movement of the lever N.

In the case of vehicles that have a brake attached to them, or that require a brake to be used when it is not desired to detach the horses, the detaching device should be provided with a sliding pin or other conveniently-operated device that can be instantly thrown into gear with the brake-lever when desired.

To the brake-bar T is rigidly attached an arm, V, to the lower end of which is pivoted the end of a rod, W, which passes back through a guide-hole in the rear bolster, and its rear end is pivoted to a hand-lever or has a knob or other handle attached to it.

This construction allows the horse to be detached and the brake to be applied by a person at the rear of the vehicle should the horse become frightened when no one is in the said vehicle.

Having thus fully described our invention, we claim as new and desire to secure by Letters Patent—

1. The combination of the long pins I, the equal-armed lever J, provided with the pin K, the socket L, the connecting-rod M, and the lever N, with the thill-couplings G H and the body A of the vehicle, substantially as herein shown and described.

2. The combination of the long pins I, the equal-armed lever J, provided with the pin K, the socket L, the connecting-rod M, the lever N, the connecting-rods P R, the bent lever Q, and the brake-bar T, provided with the arm S and the shoes U, with the thill-couplings and the body of the vehicle, substantially as herein shown and described.

3. The combination of the long pins I, the equal-armed lever J, provided with the pin K, the socket L, the connecting-rod M, the lever N, the connecting-rods P R, the bent lever Q, the brake-rod T, provided with the arms and shoes S V U, and the pivoted bar W, with the thill-couplings and the body of the vehicle, substantially as herein shown and described.

ABE O. KAPLAN.
ADOLPH ILLOWY.

Witnesses:
   THEO. F. SPEAR,
   GABE MILLER.